US012563648B2

(12) United States Patent
Liew et al.

(10) Patent No.: US 12,563,648 B2
(45) Date of Patent: Feb. 24, 2026

(54) DEVICE AND METHOD FOR SYNCHRONIZED LIGHT AND SOUND EMISSIONS

(71) Applicant: AGENCY FOR SCIENCE, TECHNOLOGY AND RESEARCH, Singapore (SG)

(72) Inventors: Weng Heng Liew, Singapore (SG); Kui Yao, Singapore (SG); Shuting Chen, Singapore (SG)

(73) Assignee: AGENCY FOR SCIENCE, TECHNOLOGY AND RESEARCH, Singapore (SG)

(*) Notice: Subject to any disclaimer, the term of this patent is extended or adjusted under 35 U.S.C. 154(b) by 251 days.

(21) Appl. No.: 18/571,298

(22) PCT Filed: Jun. 15, 2022

(86) PCT No.: PCT/SG2022/050413
§ 371 (c)(1),
(2) Date: Dec. 18, 2023

(87) PCT Pub. No.: WO2022/271097
PCT Pub. Date: Dec. 29, 2022

(65) Prior Publication Data
US 2024/0287380 A1 Aug. 29, 2024

(30) Foreign Application Priority Data
Jun. 23, 2021 (SG) ............................ 10202106883X

(51) Int. Cl.
*H03G 5/00* (2006.01)
*C09K 11/02* (2006.01)
(Continued)

(52) U.S. Cl.
CPC ............ *H05B 33/20* (2013.01); *C09K 11/025* (2013.01); *C09K 11/565* (2013.01); *C09K 11/57* (2013.01);
(Continued)

(58) Field of Classification Search
CPC ........ H05B 33/20; H05B 44/00; H05B 33/14; C09K 11/025; C09K 11/565; C09K 11/57; C09K 11/58; H04R 3/04; H04R 2430/01
(Continued)

(56) References Cited

U.S. PATENT DOCUMENTS

| | | | |
|---|---|---|---|
| 6,613,455 B1 | 9/2003 | Matsumoto et al. | |
| 2020/0018877 A1 | 1/2020 | Zhou et al. | |

FOREIGN PATENT DOCUMENTS

| | | | | |
|---|---|---|---|---|
| CN | 107698907 A | 2/2018 | | |
| KR | 20170025335 A | 3/2017 | | |
| KR | 20190012889 A | * 2/2019 | ............ | H01L 41/45 |

OTHER PUBLICATIONS

Search Report and Written Opinion in International Application No. PCT/SG2022/050413 dated Feb. 3, 2023, 11 pages.
(Continued)

*Primary Examiner* — Ammar T Hamid
(74) *Attorney, Agent, or Firm* — Marshall Gerstein & Borun LLP

(57) ABSTRACT

Devices and method for synchronized light and sound emission are disclosed. The device comprises: a first electrode layer; a second electrode layer; and a composite material layer disposed between the first electrode layer and the second electrode layer, the composite material layer having an electromechanical active matrix and an electroluminescent component; and wherein the electroluminescent component comprises a plurality of particle sets dispersed in
(Continued)

100
108 112
110 104 106
112
102
Electrical signal ➡ Device with synchronized light and sound emission ➡
Light output
Sound output the electromechanical active matrix, each particle set being continuous and having two ends each in contact with a respective one of the first and second electrode layers.

20 Claims, 13 Drawing Sheets

(51) Int. Cl.

| | |
|---|---|
| *C09K 11/56* | (2006.01) |
| *C09K 11/57* | (2006.01) |
| *C09K 11/58* | (2006.01) |
| *H04R 3/04* | (2006.01) |
| *H05B 33/14* | (2006.01) |
| *H05B 33/20* | (2006.01) |
| *H05B 44/00* | (2022.01) |
| *H04R 25/00* | (2006.01) |

(52) U.S. Cl.
CPC ................ *C09K 11/58* (2013.01); *H04R 3/04* (2013.01); *H05B 33/14* (2013.01); *H05B 44/00* (2022.01); *H04R 2430/01* (2013.01)

(58) Field of Classification Search
USPC ..................................................... 381/98, 172
See application file for complete search history.

(56) References Cited

OTHER PUBLICATIONS

Invitation to Amend in SG Application No. 11202309736Y dated Aug. 5, 2025, 7 pages.

\* cited by examiner

200

550

504

108,110

502

500

600

704

702

700

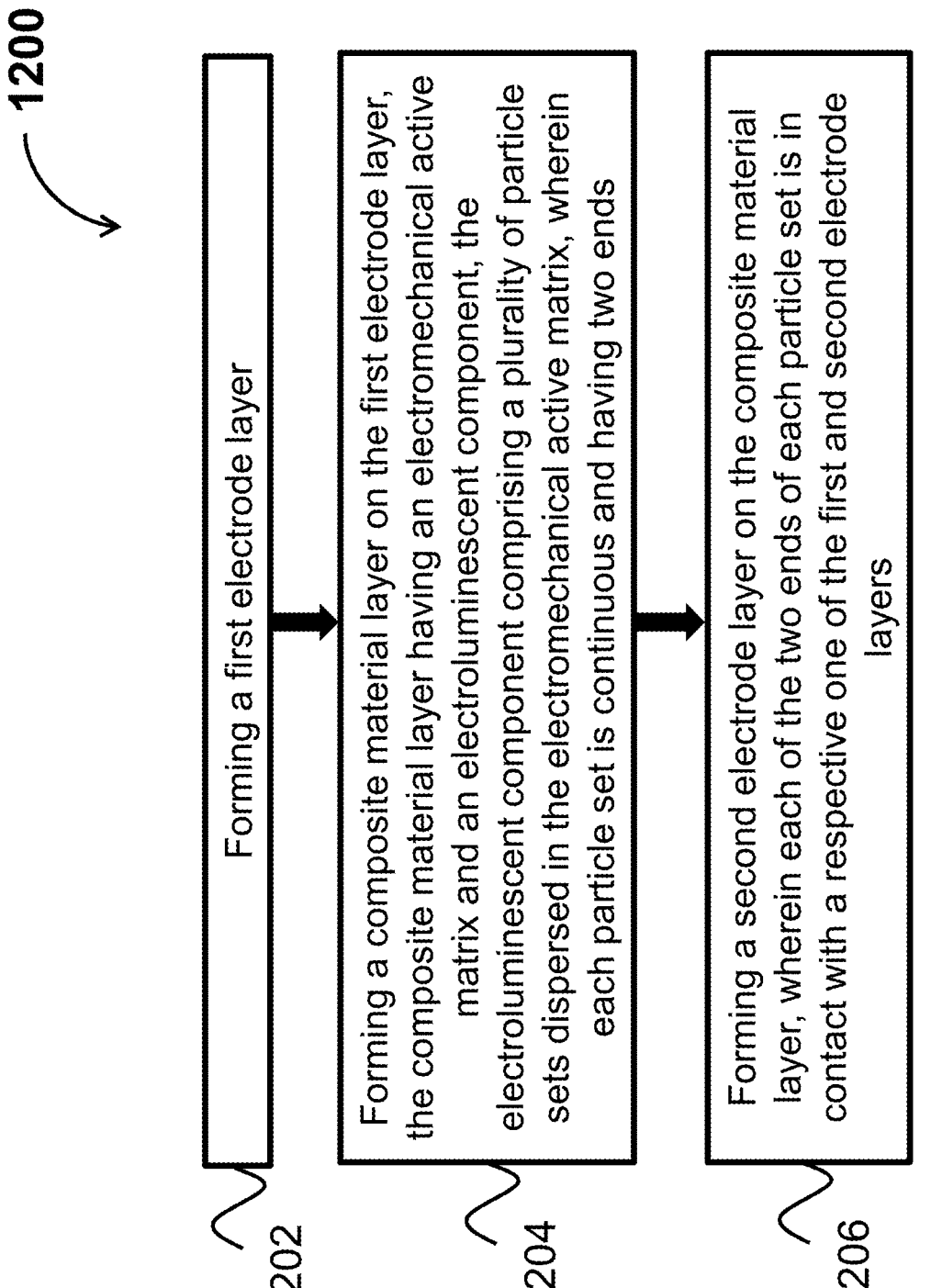

1200

1202 Forming a first electrode layer

1204 Forming a composite material layer on the first electrode layer, the composite material layer having an electromechanical active matrix and an electroluminescent component, the electroluminescent component comprising a plurality of particle sets dispersed in the electromechanical active matrix, wherein each particle set is continuous and having two ends 1206 Forming a second electrode layer on the composite material layer, wherein each of the two ends of each particle set is in contact with a respective one of the first and second electrode layers

*FIG. 12*

DEVICE AND METHOD FOR SYNCHRONIZED LIGHT AND SOUND EMISSIONS

FIELD OF INVENTION

The present invention relates broadly, but not exclusively, to devices and methods for synchronized light and sound emission.

BACKGROUND

Aural and visual communications are two of the most important modalities to convey information to the public and individuals in modern society as a large number of devices, for example, electronic advertising boards, information panels, and alarms, are constantly broadcasting information in the form of light and/or sound. Studies have also shown that a human's reaction time to a primary (usually visual) stimulus is shortened if an accessory (usually auditory) stimulus is presented at approximately the same time, which is known as intersensory facilitation.

Current devices have separated individual display and speaker, each with their respective signal processing electronic units, to produce the audio and video outputs. The separation of the aural and visual output into the two respective individual components in electronic devices can cause difficulty to simplify and miniaturize the device. In particular, each individual speaker and display may increase the size and weight of the device. Moreover, the speaker and display are required to be installed on the same surface and occupy larger areas since the two components could not be installed by overlapping each other in the same area. The separation of light and sound emissions into two individual modules may also pose a greater risk for desynchronized outputs as the two modules are controlled by different signal generation units.

The simplification and miniaturization of a device for concurrent audio and video outputs is thus required, especially in scenarios where available space is scarce, for example in aircrafts, automobiles, or mobile devices. The device may only include one functional material that can generate the synchronized light and sound outputs, thereby becoming an attractive option for the simplification and miniaturization of various communication and alarming devices.

Present materials may provide capabilities to generate light and sound outputs simultaneously, but the low light luminance and sound level outputs of these materials remain a major obstacle for practical device applications. Particularly, these materials include randomly distributed electroluminescent components dispersed in a matrix which results in a device that has relatively low luminance and sound level. The sizes of the electroluminescent particles in the materials are also substantially smaller than the thickness of the composite or the device.

Accordingly, a need exists to provide a device and method for synchronized light and sound emission that seeks to address some of the above problems.

SUMMARY

According to a first aspect of the present invention, there is provided a device for synchronized light and sound emission, comprising: a first electrode layer; a second electrode layer; and a composite material layer disposed between the first electrode layer and the second electrode layer, the composite material layer having an electromechanical active matrix and an electroluminescent component; and wherein the electroluminescent component comprises a plurality of particle sets dispersed in the electromechanical active matrix, each particle set being continuous and having two ends each in contact with a respective one of the first and second electrode layers.

In an embodiment, at least one of the electrode layers is optically transparent.

In an embodiment, at least one of the electrode layers is patterned to form a multi-element array.

In an embodiment, the composite material layer is configured to convert an electrical input signal to synchronized light and sound outputs.

In an embodiment, the electrical input signal comprises an amplitude and a frequency selected to control a sound level and a frequency of the sound output.

In an embodiment, the amplitude and the frequency of the electrical input signal are selected to control a luminance and a wavelength of the light output.

In an embodiment, the electromechanical active matrix comprises a piezoelectric polymer.

In an embodiment, the piezoelectric polymer comprises poly(vinylidene fluoride) (PVDF) or poly(vinylidene fluoride-trifluoroethylene) (P(VDF-TrFE).

In an embodiment, the electroluminescent component comprises an inorganic phosphor.

In an embodiment, the inorganic phosphor comprises ZnS:Cu or ZnS:Mn.

In an embodiment, each of the first electrode layer and the second electrode layer comprises an electrically conductive polymer, a metal or an alloy.

In an embodiment, the device further comprises a transparent substrate disposed adjacent to the first electrode layer or the second electrode layer.

In an embodiment, the first electrode layer or the second electrode layer comprises an opaque electrode layer having a reflective surface.

In an embodiment, the device further comprises an opaque substrate disposed adjacent to the first electrode layer or the second electrode layer.

In an embodiment, each of the plurality of particle sets has a particle size substantially the same as a thickness of the composite material layer.

In an embodiment, the electroluminescent component is continuous in a direction that is substantially perpendicular to the first and second electrode layers.

In an embodiment, an alarm comprises the device according to the first aspect.

According to a second aspect of the present invention, there is provided a method for synchronized light and sound emission, comprising: providing a device according to the first aspect; and applying an electrical input signal to generate synchronized light and sound outputs.

In an embodiment, applying an electrical input signal comprises applying an alternating current (AC) electric field across the composite material layer.

In an embodiment, applying the electrical input signal comprises selecting an amplitude and a frequency of the electrical input signal to control a sound level and a frequency of the sound output.

In an embodiment, applying the electrical input signal further comprises selecting the amplitude and the frequency of the electrical input signal to control a luminance and a wavelength of the light output.

According to a third aspect of the present invention, there is provided a method of fabricating a device for synchronized light and sound emission, comprising: forming a first electrode layer; forming a composite material layer on the first electrode layer, the composite material layer having an electromechanical active matrix and an electroluminescent component, the electroluminescent component comprising a plurality of particle sets dispersed in the electromechanical active matrix, wherein each particle set is continuous and having two ends; forming a second electrode layer on the composite material layer; wherein each of the two ends of each particle set is in contact with a respective one of the first and second electrode layers.

In an embodiment, the method further comprises patterning at least one of the electrode layers to form a multi-element array.

In an embodiment, the method further comprises disposing a transparent substrate adjacent to the first electrode layer or the second electrode layer.

In an embodiment, the method further comprises disposing an opaque substrate adjacent to the first electrode layer or the second electrode layer.

BRIEF DESCRIPTION OF THE DRAWINGS

Embodiments of the invention will be better understood and readily apparent to one of ordinary skill in the art from the following written description, by way of example only, and in conjunction with the drawings, in which:

FIG. 12 shows a flowchart illustrating a method for fabricating a device for synchronized light and sound emission, according to an example embodiment.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. Herein, a device and method for synchronized light and sound emission are presented in accordance with present embodiments which may have the advantages of having a single device that emits both sound and light simultaneously while having a single signal processing electronic unit for both sound and light emission. The device as described has the potential for further simplification and miniaturization, can be a flexible light and sound generation device and may have relative higher light luminance with synchronized light and sound emissions. The effective piezoelectric coefficient of the composite material and sound level can lead to synchronized light and sound emissions. Synchronizing the aural and visual outputs in the device can enrich the content of the communications and create a captivating experience. Such a device can also lower the sensory threshold for detection of stimuli and increase the rate of recognition and identification of stimuli. Accordingly, alarms or indicators with synchronized light and sound outputs are more noticeable and capable of alarming the individuals about the event occurrence with a shorter reaction time.

Figure 1A:
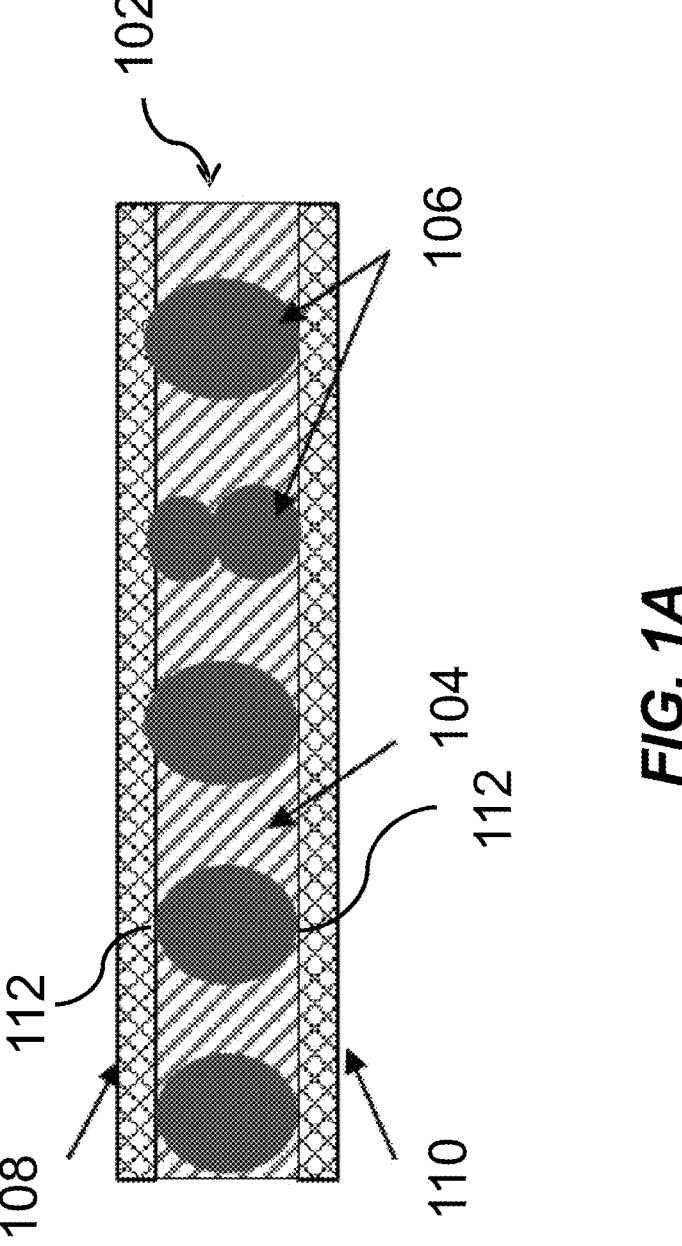
FIG. 1A shows a cross-sectional view of a device for synchronized light and sound emission, according to an example embodiment.
Figure 1A:
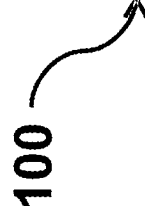
Figure 1B:
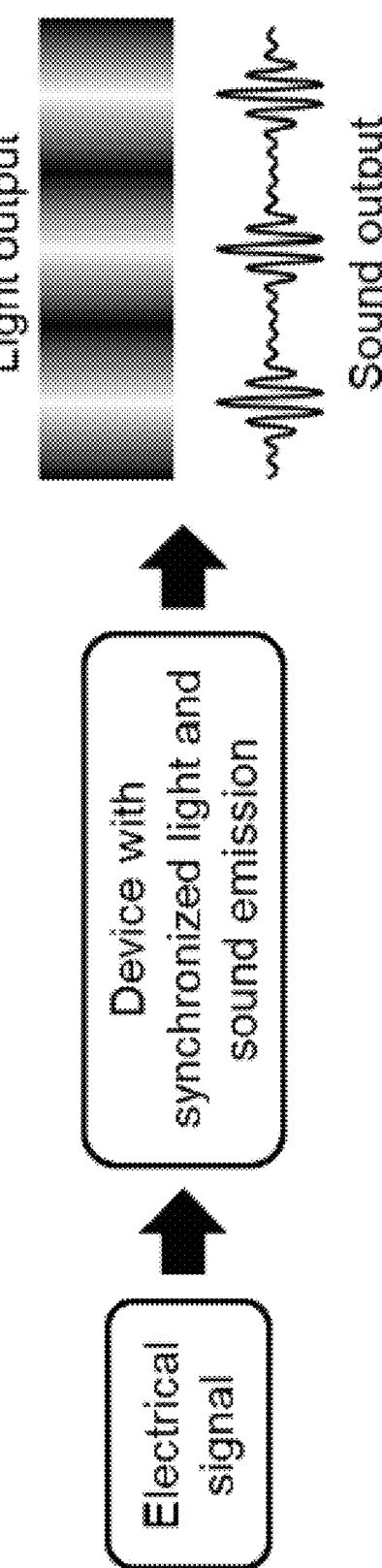
FIG. 1B shows a schematic representation of a device functionality of synchronized light and sound emission, according to an example embodiment.

FIG. 1A shows a side cross sectional view of a device 100 for synchronized light and sound emission while FIG. 1B shows a schematic representation of a device 100 for emitting synchronized light and sound, according to an example embodiment. The device 100 includes a first electrode layer 108, a second electrode layer 110 and a composite material layer 102 disposed between the first electrode layer 108 and the second electrode layer 110. The composite material layer 102 may have an electromechanical active matrix 104 and an electroluminescent component 106. At least one of the first and second electrode layers 108, 110 may be optically transparent to visible light and each of the first and second electrode layers 108, 110 includes an electrically conductive material, such as a conductive polymer, a metal, or an alloy. In addition, at least one of the first and second electrode layers 108, 110 may be patterned to form a multi-element array and will be further described in FIGS. 10A and 10B.

The electroluminescent component 106 may comprise a plurality of particle sets dispersed in the electromechanical active matrix 104. The electroluminescent component 106 may comprise a phosphor, such as inorganic ZnS:Cu and ZnS:Mn. Each particle set of the electroluminescent component 106 is continuous and has two ends 112 each in contact with a respective one of the first and second electrode layers 108, 112. As shown in FIG. 1A, each particle set of the electroluminescent component 106 may be continuous in the direction that is substantially perpendicular to the first and second electrode layers 108, 112. In this way, a parallel electrical connection may be formed by the electromechanical active matrix 104 and the electroluminescent component 106 between the two electrode layers 108, 110. The parallel electrical connectivity by the respective electromechanical matrix 104 and the electroluminescent component 106 can increase the light luminance and sound level of the device 100.

The device 100 may be driven by an electrical input signal to generate synchronized light and sound emissions. The composite material 102 may be configured to convert the electrical input signal to synchronized light and sound outputs. The electrical input signal may have an amplitude and a frequency selected to control a sound level and a frequency of the sound output. In an example embodiment, the electromechanical matrix 104 deforms when an alternating current (AC) electric field is applied across the composite material 102 through the two electrode layers 108, 110 to produce an audible sound output. The frequency of the sound output may be determined by the frequency of the AC electric field (or electrical input signal) and the magnitude of the sound output (or sound level) may be determined by the amplitude of the AC electric field (or electrical input signal).

In an embodiment, the electromechanical active matrix 104 may include a piezoelectric material, such as a piezoelectric polymer, poly(vinylidene fluoride) (PVDF) and poly(vinylidene fluoride-trifluoroethylene) (P(VDF-TrFE). The amplitude and the frequency of the electrical input signal may be selected to control a luminance and a wavelength of the light output. In an example embodiment, when an AC electric field is applied across the composite material 102, the electroluminescent component 106 emits light in the region covered by the electrode layers 108, 110, where the region is defined as an active area of the device 100. The wavelength of the light output may be dependent on the chemical composition of the electroluminescent component 106 and the frequency of the applied AC electric field (or electrical input signal) while the luminance of the light output may be dependent on the amplitude of the applied AC electric field (or electrical input signal).

In an embodiment, when an electrical input signal with modulated frequency and amplitude is applied to the device 100, synchronized sound and light outputs are generated simultaneously. Since both the light luminance and sound level are correlated to the magnitude of the applied electric signal, the change in light luminance is synchronized with the change in sound level excited by the same electrical signal.

In an example embodiment, a substrate (not shown in the Figure) may be disposed adjacent to the first electrode layer 108 or the second electrode layer 110. The substrate may be transparent and may form on one or both sides of the composite material 102 with the first and second electrode layers 108, 110 to provide external mechanical protection and support. In an alternate embodiment, the substrate may not be transparent but may still provide external mechanical protection and support for the device 100. When the composite material 102 forms on an opaque substrate or an electrode layer with a reflective surface, luminance of the device 100 to the opposite side can be enhanced as the light emitted from the composite material 102 is concentrated in the corresponding direction perpendicular to the reflective surface. The transparent substrate can be used with light transmission may tailor light output of the device 100. As an additional mechanical structure, the substrate may also change or tune the sound output of the device 100. The substrate is described in detail in FIGS. 7, 8 and 9.

The device with synchronized light and sound emissions as mentioned above is further described in detail through the following embodiments.

Figure 2B:
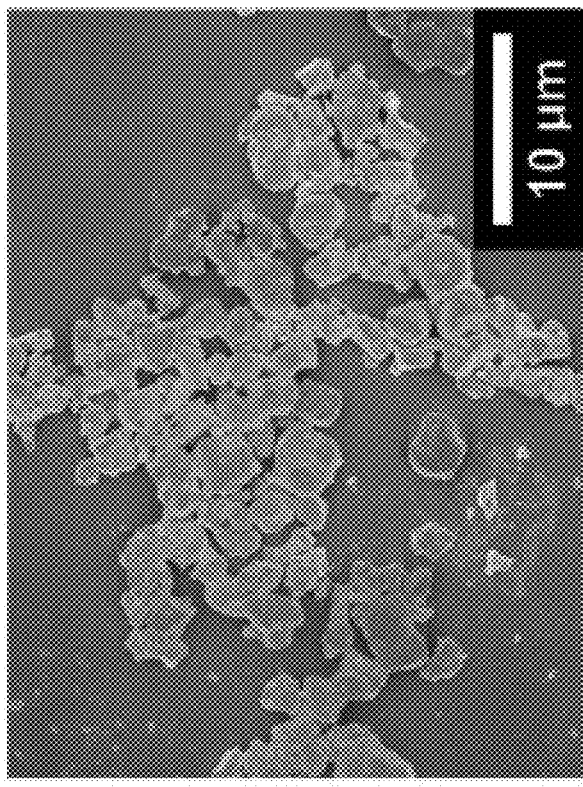
FIGS. 2A and 2B show scanning electron microscopy images (SEM) of different particle sizes of the electroluminescent component of FIG. 1A, according to an example embodiment.
Figure 2B:
Figure 2A:
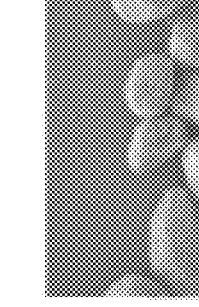
Figure 2A:
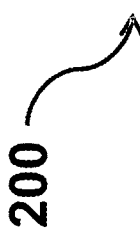

FIGS. 2A and 2B show scanning electron microscopy images (SEM) 200 of different particle sizes of the electroluminescent component 106 of FIG. 1A, according to an example embodiment. In this embodiment, the electromechanical active matrix 104 of the composite material 102 may be a piezoelectric polymer, poly(vinylidene fluoride-trifluoroethylene) (P(VDF-TrFE) while the electroluminescent component 106 may be an electroluminescent phosphor, copper-doped zinc sulfide (ZnS:Cu). The ZnS:Cu powder can be mixed into the P(VDF-TrFE) solution with a specified volume ratio of 1.1:1 (ZnS:Cu:P(VDF-TrFE)) and stirred for two hours to ensure the mixture is mixed evenly. The ZnS:Cu powders having different particle sizes, for example approximately 25 μm (as shown in FIG. 2A) and approximately 5 μm (as shown in FIG. 2B), may be used to prepare two composite films, respectively.

The mixture of P(VDF-TrFE) solution and ZnS:Cu can be coated on a smooth aluminium substrate as the first electrode layer 108 through a doctor blade coating method and dried at 80° C. to form a composite film. The composite film is subsequently annealed at 130° C. for 30 minutes to improve the crystallinity of the P(VDF-TrFE) for enhanced piezoelectric performance and sound output. Electrical poling is performed on the composite film through the corona poling method. The second electrode layer 110 comprising silver nanowires can be coated on the composite film through spray coating, forming a transparent second electrode layer 110.

Figure 3B:
FIGS. 3B and 3D show circuit diagrams corresponding to the different particle sizes of the electroluminescent component of FIGS. 3A and 3C respectively.
Figure 3D:
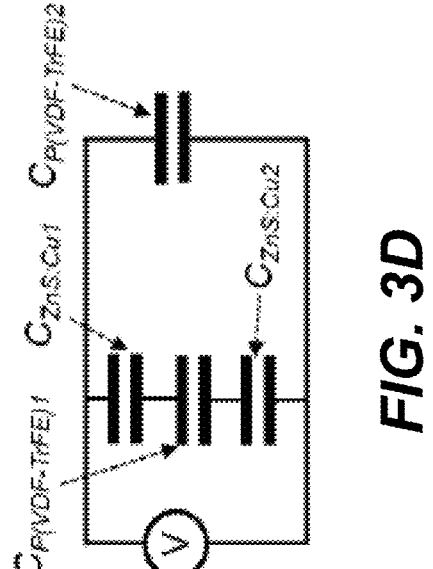
Figure 3A:
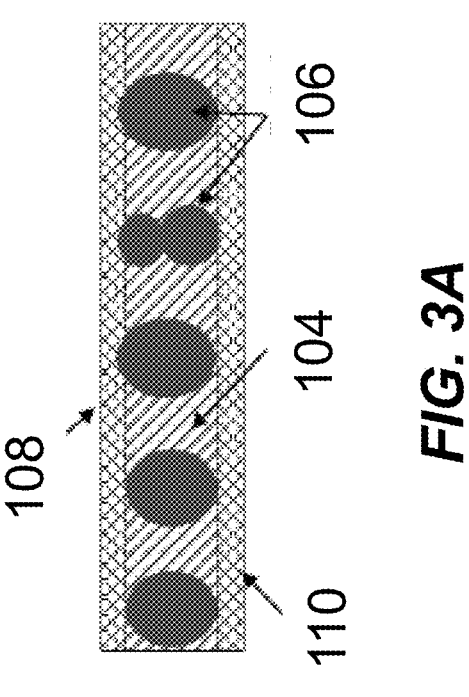
FIGS. 3A and 3C show cross-sectional views of the electroluminescent component having different particle sizes.
Figure 3C:
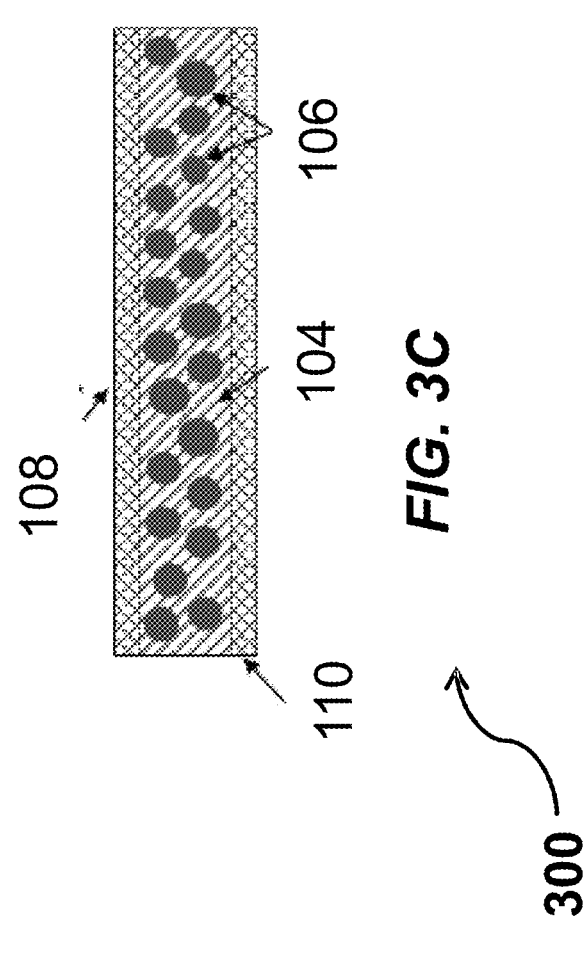

FIGS. 3A and 3C show cross-sectional views of the electroluminescent component having different particle sizes. The comparison between the different particle sizes of the electroluminescent component 106 in these Figures as well as FIGS. 3B and 3D. The thickness of the composite film (or composite material layer 102) using ZnS:Cu powders with larger particle size (approximately 25 μm) may be about 25 μm with measurement tolerance of 1 to 2 μm, while the thickness of the composite film using ZnS:Cu powders with smaller particle size (approximately 5 μm) is measured about 23 μm. Each of the plurality of particle sets has a particle size substantially the same as a thickness of the composite material layer 102. As the thickness of the composite film is about the same range with the larger particle size of approximately 25 μm, the ZnS:Cu particles is continuous in the direction substantially perpendicular to the electrode layers 108, 110 and are electrically connected with both the first and second electrode layers 108, 110 as shown in FIG. 3A, thus forming a 1-3 composite configuration. In contrast, ZnS:Cu particles with smaller size (approximately 5 μm) is embedded in the P(VDF-TrFE) matrix forming a 0-3 composite configuration since the ZnS:Cu particles are unable to establish continuous and direct electrical connections with the first and second electrode layers 108, 110 as illustrated in FIG. 3C.

Figure 4:
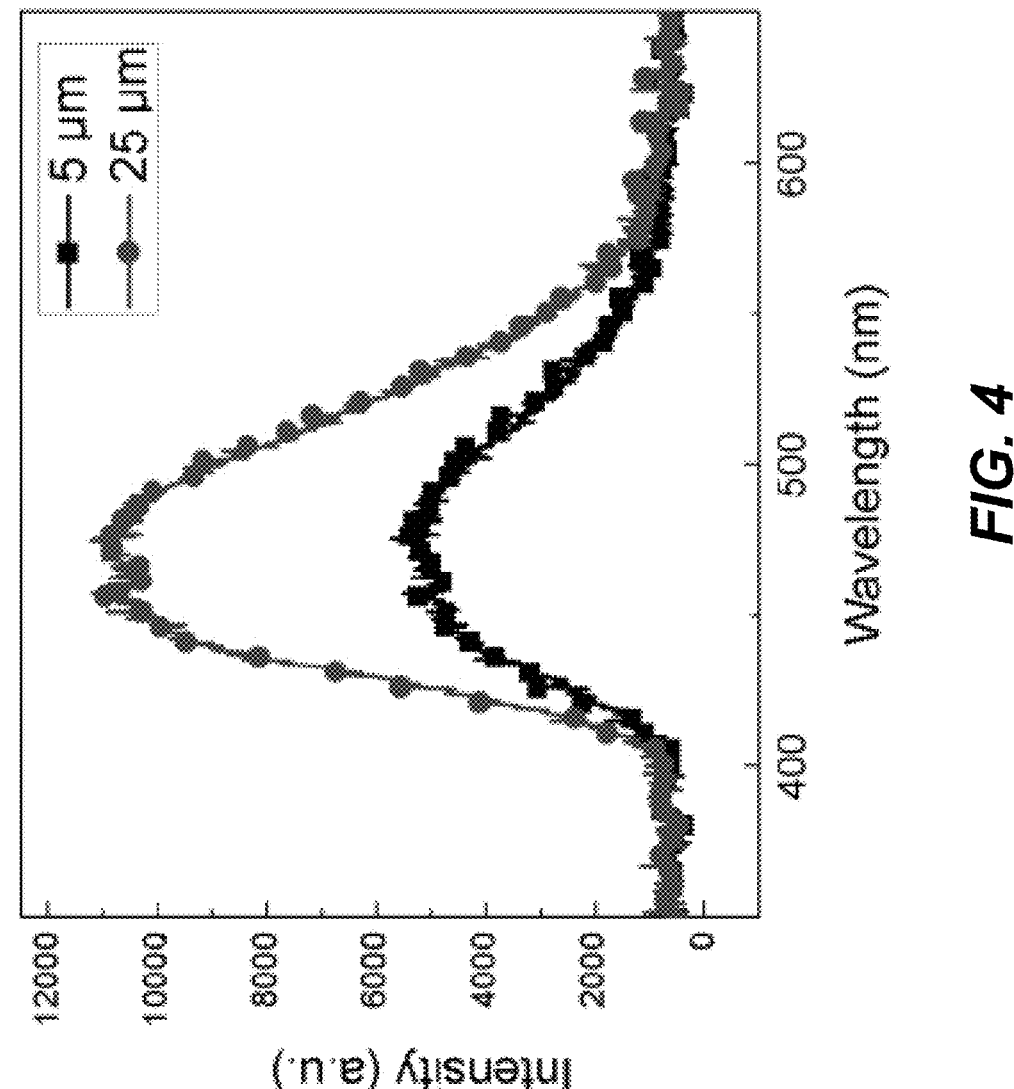
FIG. 4 shows a graph depicting the relationship between intensity and wavelength for different particle sizes of the electroluminescent component.
Figure 4:
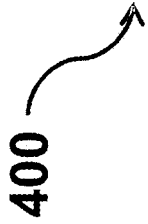

FIGS. 3B and 3D show circuit diagrams corresponding to the different particle sizes of the electroluminescent component of FIGS. 3A and 3C respectively. Since both the P(VDF-TrFE) matrix and ZnS:Cu particles with larger sizes electrically contact both the first and second electrode layers 108, 110 and are respectively continuous between the layers, the P(VDF-TrFE) matrix and ZnS:Cu particles form electrical connections in parallel to each other, as shown in the equivalent circuit in FIG. 3B. In contrast, the ZnS:Cu particles with smaller size form a hybrid electrical connection with P(VDF-TrFE) matrix, with the equivalent circuit as shown in FIG. 3D. The dielectric constants of P(VDF-TrFE) and ZnS:Cu are 13 and 9.5, respectively. Therefore, the effective voltage is applied on the ZnS:Cu (approximately 5 μm) in series connection with P(VDF-TrFE) is significantly lower than that applied on ZnS:Cu (approximately 25 μm) in parallel connection with P(VDF-TrFE). The luminance of the composite film is dependent on the electroluminescence of ZnS:Cu, and therefore, the higher effective voltage applied across the ZnS:Cu (approximately 25 μm) in parallel connection with P(VDF-TrFE) results in higher luminance for the composite film with the same weight ratio and thickness but different ZnS:Cu particle size. Such a result can be shown in FIG. 4, which shows a graph 400 depicting the relationship between intensity and wavelength for different particle sizes of the electroluminescent component 106.

Apart from the luminance of the P(VDF-TrFE)/ZnS:Cu composite, the sound output of the composite film is also significantly affected by the electrical configurations of the P(VDF-TrFE) matrix and ZnS:Cu particles. This may be attributed to the piezoelectric response of the P(VDF-TrFE) matrix in the composite film. Higher effective piezoelectric performance is thus desired to achieve stronger sound level output. As shown in FIG. 3D, the voltage cannot effectively applied to the whole P(VDF-TrFE) matrix in the hybrid connection with ZnS:Cu. Therefore, the effective piezoelectric coefficient of the composite film with the whole P(VDF-TrFE) matrix in parallel connection with ZnS:Cu is substantially higher than the composite film with P(VDF-TrFE) matrix in hybrid connection with ZnS:Cu, as measured by the laser scanning vibrometer to be 25 μm/V and 18 μm/V, respectively.

In an embodiment of the present invention, the device 100 comprising P(VDF-TrFE)/ZnS:Cu with the larger ZnS:Cu particles forming a 1-3 composite structure and equivalent parallel electrical connection can possess higher electroluminescence and piezoelectric performance, and can produce stronger light and sound emissions.

Figures 5A, 5B:
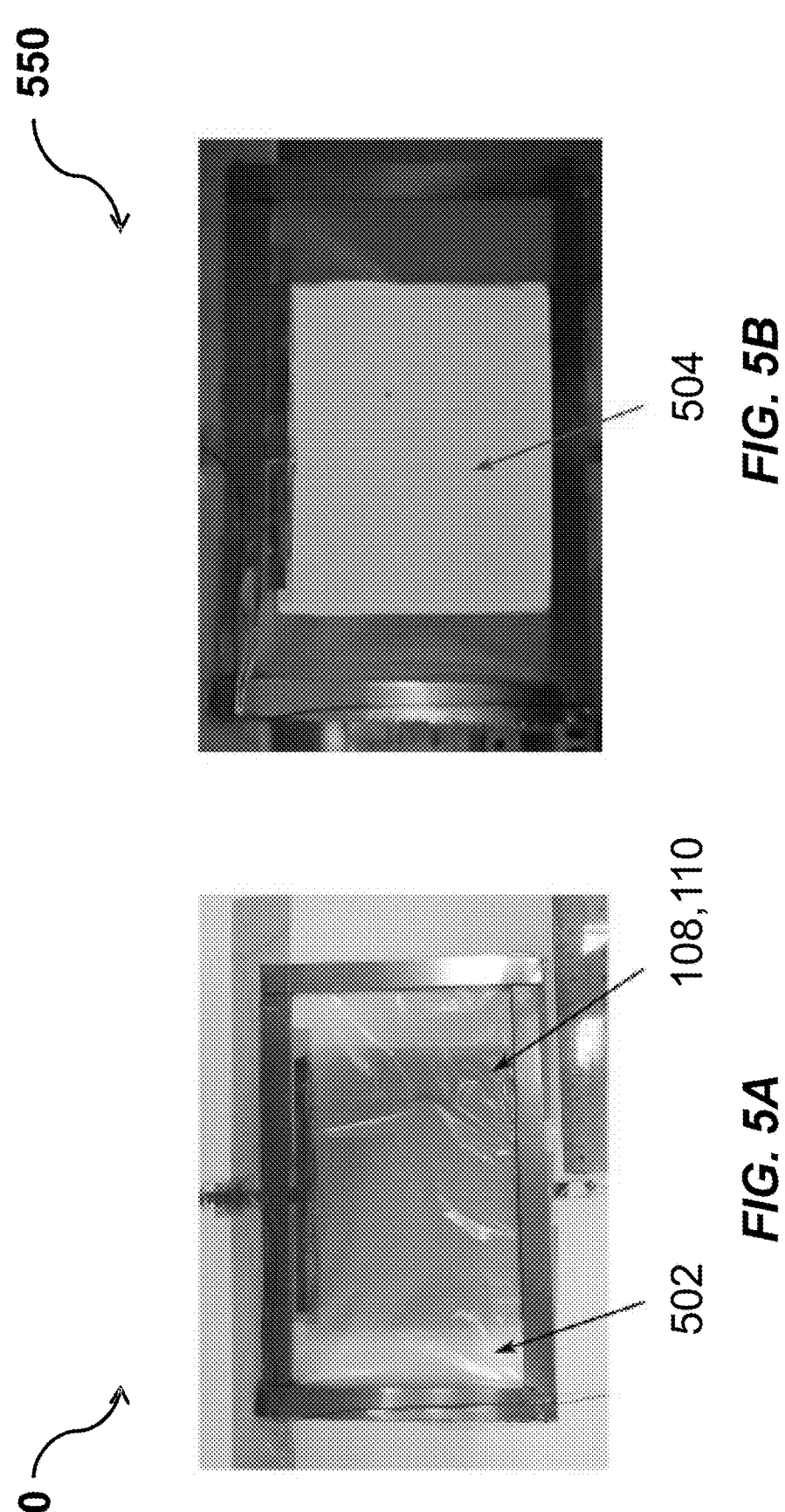
FIG. 5A shows a top view of the device of FIG. 3A having a composite film and electrode layers, according to an example embodiment.
FIG. 5B shows a top of view of the device of FIG. 5A with light emission from the active area, according to an example embodiment.

FIG. 5A shows a top view 500 of the device 100 of FIG. 3A having a composite film 502 and the electrode layers 108, 110 while FIG. 5B shows a top of view 550 of the device 100 of FIG. 5A with light emission from an active area 504, according to an example embodiment. As shown in FIG. 5A, the composite film 502 can be lifted off from the aluminium substrate to form a free-standing film. Silver nanowire is coated on the surface of the composite film 502 previously attached to the aluminium substrate through spray coating, to replace the aluminium substrate as the first electrode layer 108 to form the device 100. The two electrode layers 108, 110 are connected to an electrical signal generator and an AC electrical voltage is applied. The light and sound outputs can be observed simultaneously when an AC voltage with an amplitude of 60 V and a frequency of 1 kHz is applied to the proposed device, as shown in FIG. 5B. The sound level is measured to be approximately 72 dB using a sound meter positioning at 10 cm away.

Figure 6:
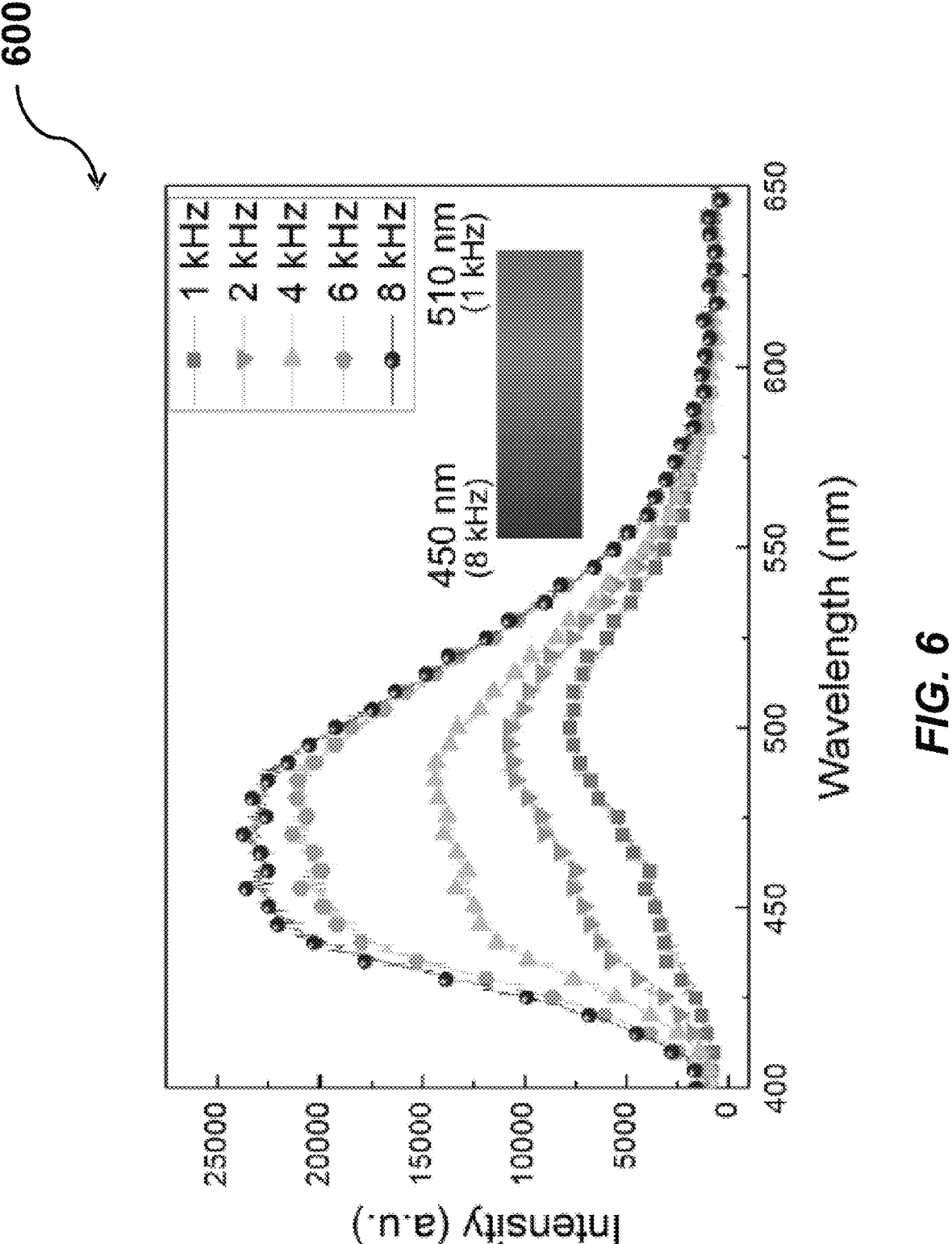
FIG. 6 shows a graph depicting the electroluminescence spectra of the device of FIG. 1A driven by different frequencies of the electric input signal, according to an example embodiment.

FIG. 6 shows a graph 600 depicting the electroluminescence spectra of the device of FIG. 1A driven by different frequencies of the electric input signal, according to an example embodiment. The device 100 in this embodiment comprises the P(VDF-TrFE)/ZnS:Cu composite film and electrode layers with the large ZnS:Cu particles, except the wavelength and luminance of the light output are controlled by the frequency of the applied electrical signal to the composite film. In this embodiment, the device 100 is driven by AC electrical signals at different frequencies, and the resulting electroluminescence spectra is manipulated by the frequency, as shown in FIG. 6. A blue shift in the wavelength of the light output is observed when the frequency of the AC electrical signal increases from 1 kHz to 8 kHz. The luminance output of the device 100 also increases with the increasing frequency of the AC electrical signal. Hence, this example demonstrates the capability of controlling the wavelength and luminance of the light output from the device by modulating the frequency of the driven electrical input signal.

Figure 7:
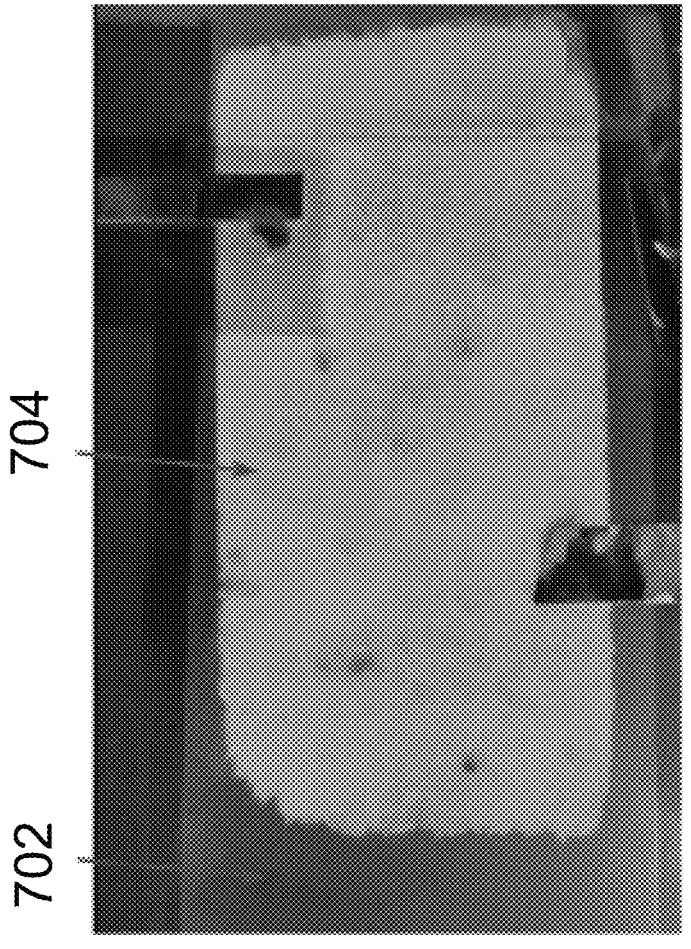
FIG. 7 shows a top view of the device of FIG. 1A having a transparent substrate, according to an example embodiment.
Figure 7:
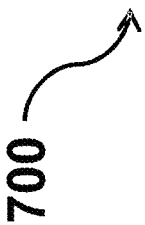

FIG. 7 shows a top view 700 of the device 100 of FIG. 1A having a transparent substrate, according to an example embodiment. The device 100 in this embodiment comprises the P(VDF-TrFE)/ZnS:Cu composite film and electrode layers with the large ZnS:Cu particles as described previously, except a transparent substrate 702 is formed on the outer surface of at least one of the electrode layers 108, 110. The solution mixture of P(VDF-TrFE)/ZnS:Cu in this example is coated on Indium tin oxide (ITO) coated PET with a thickness of 55 μm, which is an electrically conductive transparent substrate. The conductive coating, ITO, on the PET functions as the first electrode layer 108 for the device 100. A second electrode layer 110 is subsequently formed on the P(VDF-TrFE)/ZnS:Cu composite film by spray coating of silver nanowires. The light emission is observed from the active area 704 of the device 100 as shown in FIG. 7, and the corresponding synchronized sound level is measured to be approximately 65 dB.

Figure 8:
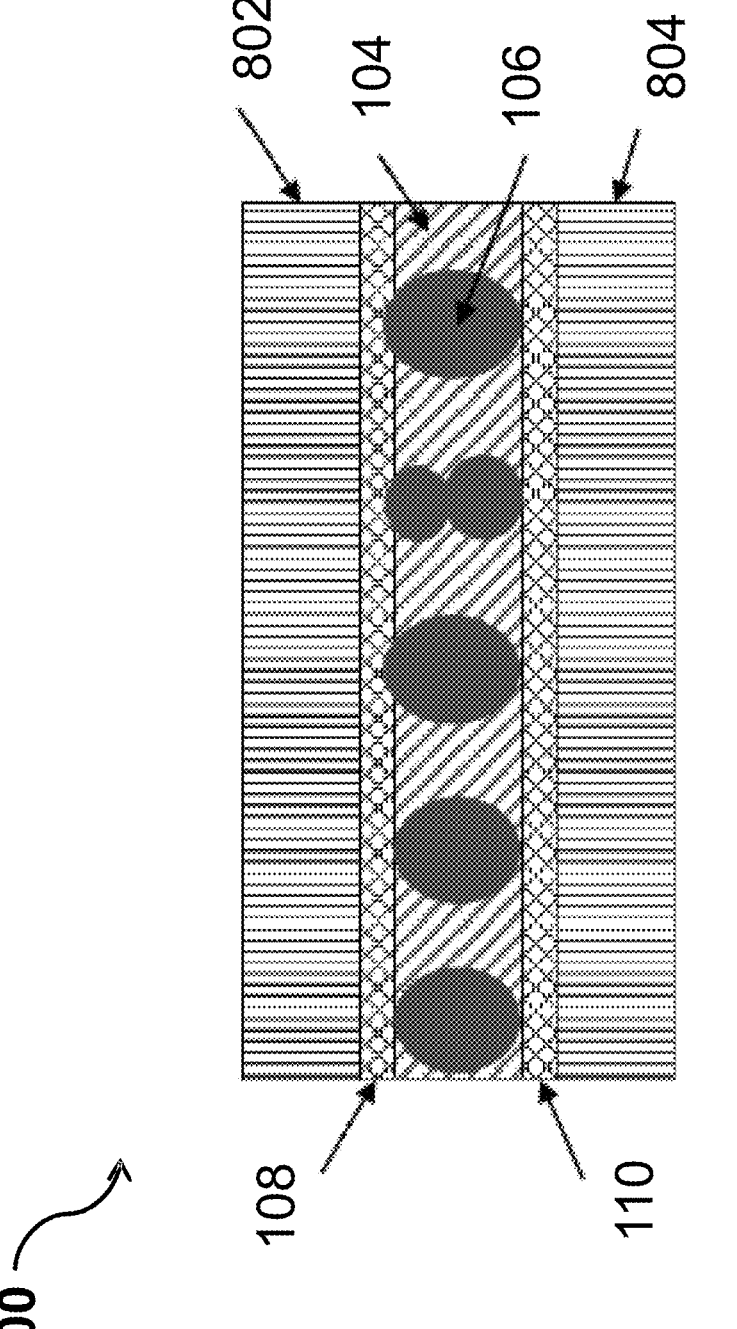
FIG. 8 shows a cross-sectional view of the device of FIG. 1A having two transparent laminating films, according to an example embodiment.

FIG. 8 shows a cross-sectional view 800 of the device 100 of FIG. 1A having a transparent laminating film, according to an example embodiment. The device 100 in this embodiment comprises the P(VDF-TrFE)/ZnS:Cu composite film (or composite material layer 104) and electrode layers 108, 110 with the large ZnS:Cu particles as described previously, except the P(VDF-TrFE)/ZnS:Cu composite film 104 and electrode layers 108, 110 are sandwiched between two transparent substrates 802, 804. In other words, the transparent substrate 702 is disposed adjacent to the first electrode layer 108 or the second electrode layer 110. The P(VDF-TrFE) composite film 104 and electrode layers 108, 110 in this example are laminated using transparent laminating films 802, 804 with a thickness of 40 μm to form two transparent substrates 802, 804 sandwiching the P(VDF-TrFE) composite film (or composite material layer 104) and electrode layers 108, 110 as shown in the Figure. In an alternative embodiment, an opaque substrate (not shown in the Figure) can be disposed adjacent to the first electrode layer 108 or the second electrode layer 110.

Figure 9:
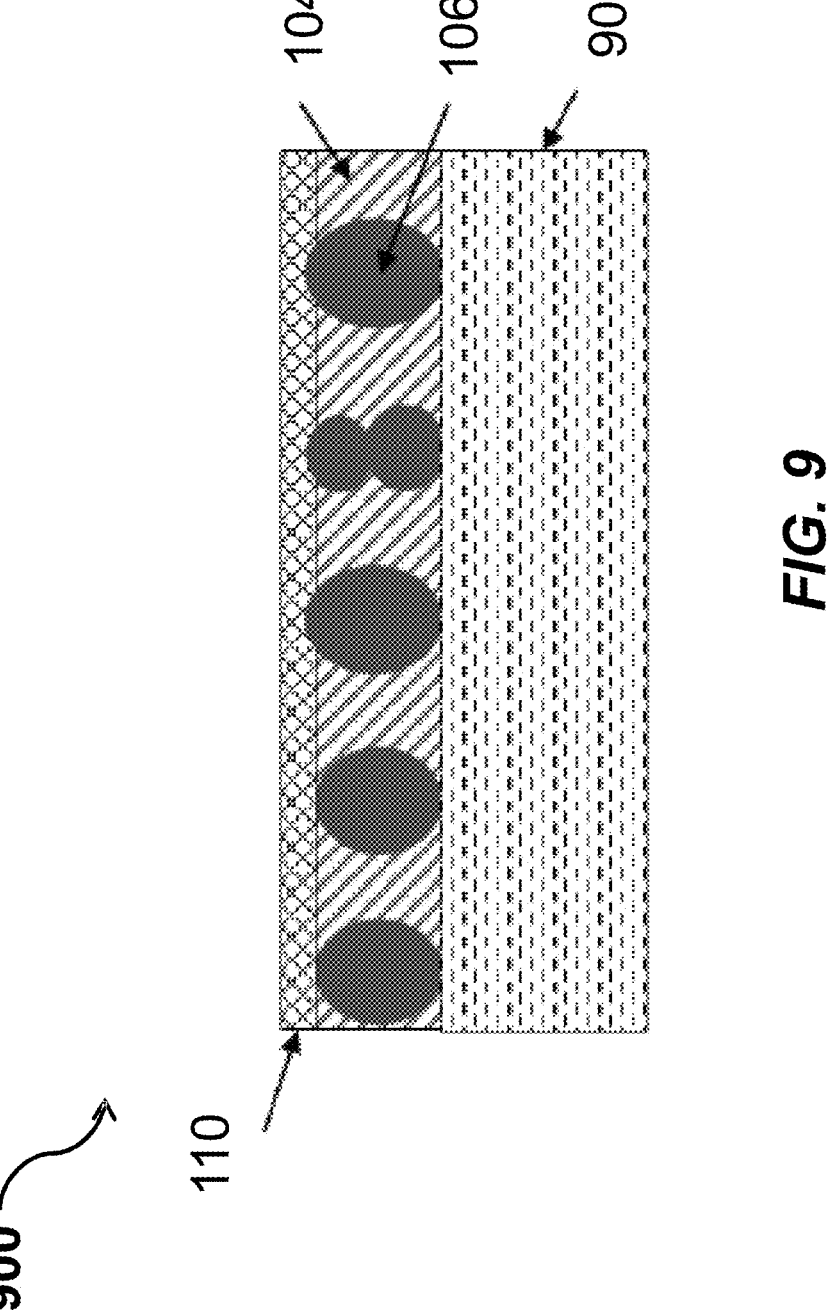
FIG. 9 shows a cross-sectional view of the device of FIG. 1A having a reflective surface electrode layer, according to an example embodiment.

FIG. 9 shows a cross-sectional view 900 of the device 100 of FIG. 1A having a reflective surface electrode layer, according to an example embodiment. The device 100 in this embodiment is similar to the device of FIG. 8, except that the P(VDF-TrFE)/ZnS:Cu composite film (or composite material layer 104) is formed on a reflective surface of an opaque electrode layer 902. The solution mixture of P(VDF-TrFE)/ZnS:Cu in this example is coated on the surface of a reflective aluminium foil 902 to form the composite film 104 on the reflective surface. The aluminium foil 902 also functions as the first electrode layer 108. A transparent second electrode layer 110 is subsequently formed on an opposite surface of the P(VDF-TrFE)/ZnS:Cu composite film 104 by spray coating of silver nanowires to form the device 100 as shown in the Figure. It can be appreciated that the aluminium foil 902 (or opaque electrode layer) may also function as the second electrode layer 110.

Figures 10A, 10B:
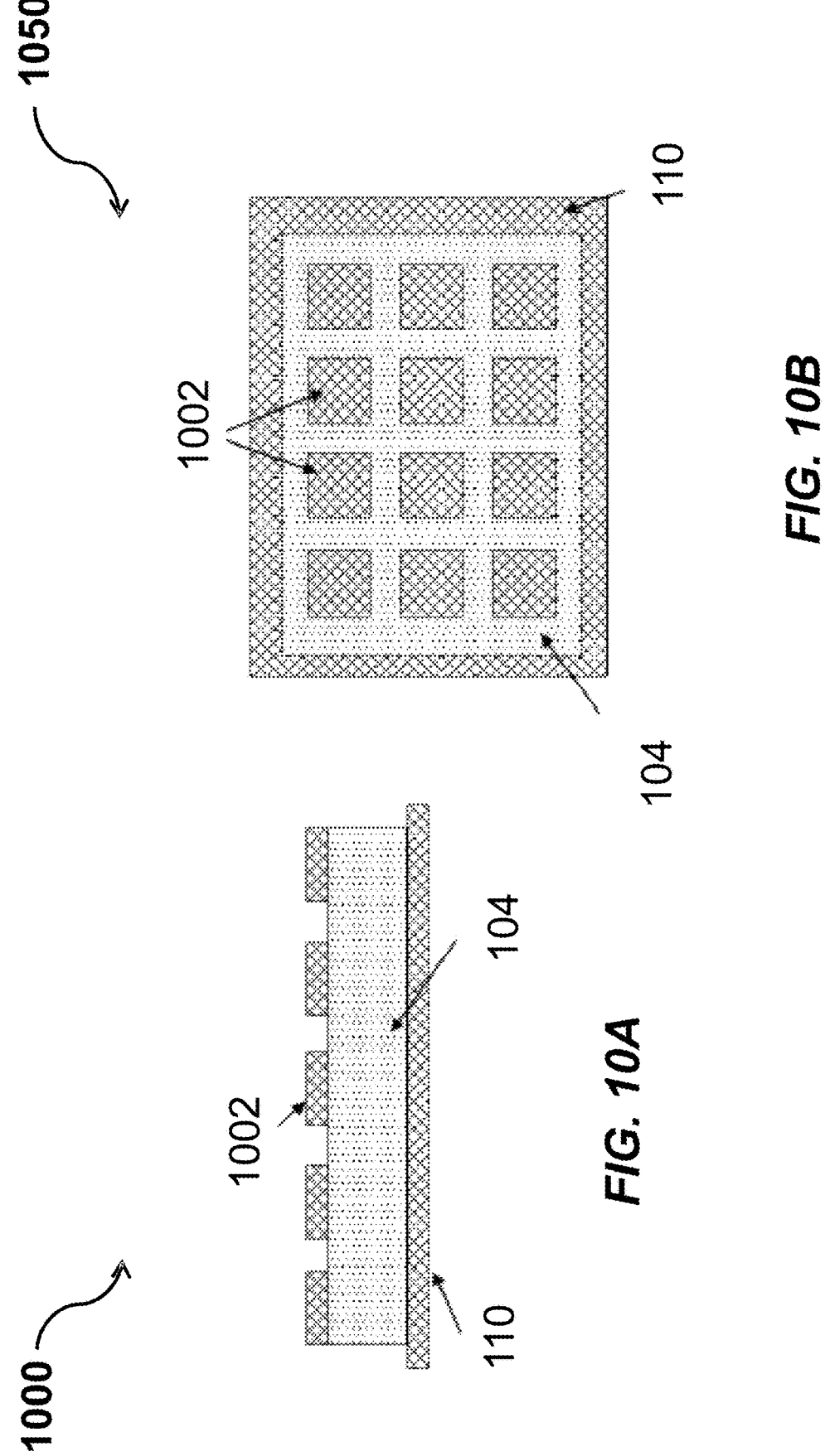
FIG. 10A shows a cross-sectional view and FIG. 10B shows a top view of the device of FIG. 1A having a patterned first electrode layer, according to an example embodiment.

FIG. 10A shows a cross-sectional view 1000 and FIG. 10B shows a top view 1050 of the device 100 of FIG. 1A having a patterned first electrode layer, according to an example embodiment. The device 100 in this embodiment is similar to the device of FIG. 8, except at least one of the electrode layers 108, 110 is patterned to form an array 1002 resulting in a multi-element display device with synchronized sound output. In this example, the first electrode layer 108 is patterned to form a two-dimensional array 1002 on the P(VDF-TrFE)/ZnS:Cu composite film, in which each element of the two-dimensional array is electrically insulated with each other, as shown in the FIG. 10A and FIG. 10B. Each element of the two-dimensional array can be driven respectively by an independent electrical input signal with different magnitude and/or frequency to produce a display module capable of displaying a light pattern or image while generating a sound output simultaneously.

In an example embodiment, an alarm can comprise the device 100 with synchronized light and sound emissions as described above to provide synchronized audible and visual alert signals. The device 100 is driven by an electrical signal triggered by an event and generates the noticeable signals consisting synchronized light and sound to alarm the individuals in vicinity about the event occurrence. The frequency and amplitude of driving the electrical input signal can be modulated to form a repeating pattern of the audible and visual alarm signals.

Figure 11:
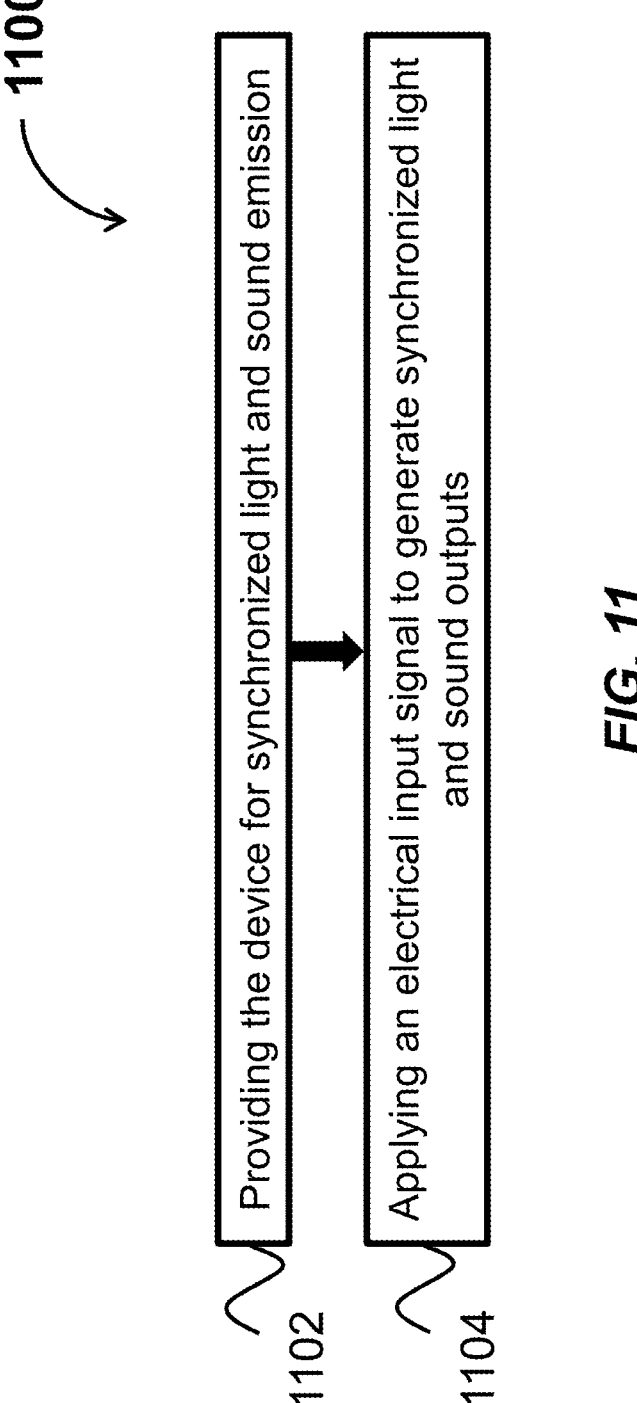
FIG. 11 shows a flowchart illustrating a method for emitting synchronized light and sound, according to an example embodiment.

FIG. 11 shows a flowchart 1100 illustrating a method for emitting synchronized light and sound, according to an example embodiment. The method comprises, at step 1102, providing the device as described. At step 1104, the method comprises applying an electrical input signal to generate synchronized light and sound outputs.

FIG. 12 shows a flowchart 1200 illustrating a method for fabricating a device for synchronized light and sound emission, according to an example embodiment. The method includes, at step 1202, forming a first electrode layer. At step 1204, the method comprises forming a composite material layer on the first electrode layer, the composite material layer having an electromechanical active matrix and an electroluminescent component, the electroluminescent component comprising a plurality of particle sets dispersed in the electromechanical active matrix, wherein each particle set is continuous and having two ends. At step 1206, the method comprises forming a second electrode layer on the composite material layer, wherein each of the two ends of each particle set is in contact with a respective one of the first and second electrode layers.

The device and method for synchronized light and sound emission as described herein may provide synchronized aural and visual outputs which may enrich the content of the communications and create a more captivating experience. Alarms or indicators with synchronized light and sound outputs are more noticeable and capable of alarming the individuals about the even occurrence with shorter reaction time. The luminance and acoustic outputs of the P(VDF-TrFE)/ZnS:Cu composite is significantly improved over the conventional composite in typical devices. The device may be used in applications where there is a need to capture people's attention, such as warning signs, alarms and indicators, thin multimedia panels with light and sound outputs, such as advertisement and information boards, decorative pieces, innovative devices requiring screen with light and sound output, such as smart curtains, lighting and wallpaper, and even possible TV and handphone screens that can display and speak simultaneously.

While exemplary embodiments have been presented in the foregoing detailed description of the invention, it should be appreciated that a vast number of variations exist.

It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of elements and method of operation described in an exemplary embodiment without departing from the scope of the invention as set forth in the appended claims.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A device for synchronized light and sound emission, comprising:
   a first electrode layer;
   a second electrode layer; and
   a composite material layer disposed between the first electrode layer and the second electrode layer, the composite material layer having an electromechanical active matrix and an electroluminescent component; and
   wherein the electroluminescent component comprises a plurality of particle sets dispersed in the electromechanical active matrix, each particle set being continuous and having two ends each in contact with a respective one of the first and second electrode layers.

2. The device as claimed in claim 1, wherein at least one of the electrode layers is optically transparent.

3. The device as claimed in claim 1, wherein at least one of the electrode layers is patterned to form a multi-element array.

4. The device as claimed in claim 1, wherein the composite material layer is configured to convert an electrical input signal to synchronized light and sound outputs, wherein the electrical input signal comprises an amplitude and a frequency selected to control a sound level and a frequency of the sound output, and wherein the amplitude and the frequency of the electrical input signal are selected to control a luminance and a wavelength of the light output.

5. The device as claimed in claim 1, wherein the electromechanical active matrix comprises a piezoelectric polymer, and wherein the piezoelectric polymer comprises poly(vinylidene fluoride) (PVDF) or poly(vinylidene fluoride-trifluoroethylene) (P(VDF-TrFE).

6. The device as claimed in claim 1, wherein the electroluminescent component comprises an inorganic phosphor, and wherein the inorganic phosphor comprises ZnS:Cu or ZnS:Mn.

7. The device as claimed in claim 1, wherein each of the first electrode layer and the second electrode layer comprises an electrically conductive polymer, a metal, or an alloy.

8. The device as claimed in claim 1, further comprising a transparent substrate disposed adjacent to the first electrode layer or the second electrode layer.

9. The device as claimed in claim 1, wherein the first electrode layer or the second electrode layer comprises an opaque electrode layer having a reflective surface.

10. The device as claimed in claim 1, further comprising an opaque substrate disposed adjacent to the first electrode layer or the second electrode layer.

11. The device as claimed in claim 1, wherein each of the plurality of particle sets has a particle size substantially the same as a thickness of the composite material layer.

12. The device as claimed in claim 1, wherein the electroluminescent component is continuous in a direction that is substantially perpendicular to the first and second electrode layers.

13. A method for synchronized light and sound emission, comprising:

providing a device as claimed in claim 1; and applying an electrical input signal to generate synchronized light and sound outputs.

14. The method as claimed in claim 13, wherein applying an electrical input signal comprises:

applying an alternating current (AC) electric field across the composite material layer;

selecting an amplitude and a frequency of the electrical input signal to control a sound level and a frequency of the sound output; and selecting the amplitude and the frequency of the electrical input signal to control a luminance and a wavelength of the light output.

15. A method of fabricating a device for synchronized light and sound emission, comprising:

forming a first electrode layer;

forming a composite material layer on the first electrode layer, the composite material layer having an electromechanical active matrix and an electroluminescent component, the electroluminescent component comprising a plurality of particle sets dispersed in the electromechanical active matrix, wherein each particle set is continuous and having two ends; and forming a second electrode layer on the composite material layer;

wherein each of the two ends of each particle set is in contact with a respective one of the first and second electrode layers.

16. The method as claimed in claim 11, further comprising disposing a transparent substrate adjacent to the first electrode layer or the second electrode layer.

17. The method as claimed in claim 11, wherein the first electrode layer or the second electrode layer comprises an opaque electrode layer having a reflective surface.

18. The method as claimed in claim 11, further comprising disposing an opaque substrate adjacent to the first electrode layer or the second electrode layer.

19. The method as claimed in claim 11, wherein each of the plurality of particle sets has a particle size substantially the same as a thickness of the composite material layer.

20. The method as claimed in claim 11, wherein the electroluminescent component is continuous in a direction that is substantially perpendicular to the first and second electrode layers.

* * * * *